US011982421B2

(12) United States Patent
Xu et al.

(10) Patent No.: US 11,982,421 B2

(45) Date of Patent: May 14, 2024

(54) RETRACTABLE SPOTLIGHT

(71) Applicants: Self Electronics Co., Ltd., Zhejiang (CN); Wanjiong Lin, Zhejiang (CN); Self Electronics USA Corporation, Norcross, GA (US)

(72) Inventors: Bozhang Xu, Zhejiang (CN); Jun Chen, Zhejiang (CN); Haitao Wu, Zhejiang (CN); Qiliang Yin, Zhejiang (CN)

(73) Assignee: Sell Electronics Co., Ltd., Ningbo (CN)

( * ) Notice: Subject to any disclaimer, the term of this patent is extended or adjusted under 35 U.S.C. 154(b) by 0 days.

(21) Appl. No.: 18/335,605

(22) Filed: Jun. 15, 2023

(65) Prior Publication Data

US 2023/0408051 A1 Dec. 21, 2023

(30) Foreign Application Priority Data

Jun. 17, 2022 (CN) ......................... 202210684377.8

(51) Int. Cl.

*F21S 8/02* (2006.01)
*F21V 19/02* (2006.01)
*F21V 23/00* (2015.01)

(52) U.S. Cl.

CPC .............. *F21S 8/028* (2013.01); *F21V 19/02* (2013.01); *F21V 23/002* (2013.01)

(58) Field of Classification Search

CPC ......... F21V 23/002; F21V 19/02; F21S 8/028
See application file for complete search history.

(56) References Cited

U.S. PATENT DOCUMENTS

| | | | | | |
|---|---|---|---|---|---|
| 4,232,361 | A * | 11/1980 | Kelsall | .................... | F21V 21/30 362/404 |
| 5,513,085 | A * | 4/1996 | Bourne | ................... | F21S 8/028 362/386 |
| 2009/0091940 | A1 * | 4/2009 | Probasco | ................ | F21V 21/24 362/372 |
| 2021/0140598 | A1 * | 5/2021 | Salomon | ................. | F21V 21/30 |

FOREIGN PATENT DOCUMENTS

WO WO-2019175718 A1 * 9/2019 ............. F21S 8/028

OTHER PUBLICATIONS

Innovation Q+ NPL Search (Year: 2023).*

* cited by examiner

*Primary Examiner* — Anabel Ton

(74) *Attorney, Agent, or Firm* — Wang Law Firm, Inc.

(57) ABSTRACT

A retractable spotlight comprises a cylindrical outer casing and a lamp body movably supported inside the outer casing. A pressing assembly and a connecting assembly are disposed inside the outer casing. The pressing assembly biases the lamp body towards an extended position via the connecting assembly and is configured to be switched between a first position, in which the lamp body is in a retracted state, and a second position, in which the lamp body is in the extended state. The lamp body is rotatably connected to the connecting rod via a radial articulated shaft. The state of the lamp can be adjusted by pressing an automatic locking feature and manually pushing and pulling the lamp body, thereby increasing the versatility of single lamp adjustment while preventing excessive loads on the wire.

13 Claims, 11 Drawing Sheets

(a)

(b)

RETRACTABLE SPOTLIGHT

RELATED APPLICATION

This application claims priority to a Chinese Patent Application No. CN202210684377.8, filed on Jun. 17, 2022.

FIELD OF THE TECHNOLOGY

The present invention generally relates to the field of lamps, and relates in particular to a top spotlight or downlight that is easy to install and adjustable for retraction.

BACKGROUND

A top spotlight is widely used in daily life, and generally refers to a kind of recessed or embedded lighting fixture configured to be installed on a decorative ceiling, and is commonly used in various indoor space places, such as homes, hotels and restaurants, commercial stores, supermarkets, and the like.

Top spotlights currently on the market are mostly installed on the ceiling using flexible fasteners or fastening parts, which are mostly non-removable and integral (one-piece structure) products, and the irradiation angle cannot be flexibly adjusted after installation, which can easily result in damages to the ceiling during later maintenance. Moreover, when the lamp is adjusted, the internal power supply wires move relative to fixed parts, such as an internal PCB-board, which can easily lead to a decrease in the strength of the solder joints between the wires and the PCB board inside the lamp, affecting the reliability of electrical connection. In the existing technology a lamp with telescopic control function exists to achieve a single manual adjustment, but in some top lighting applications, the lamp head is in an anti-glare surface frame, that is, when the lamp head is deeply concave and not higher than the surface frame, there is a certain degree of difficulty in adjusting the lamp head, and hence the requirements of a variety of applications cannot be met.

Therefore, the skilled person in the field is committed to developing a telescopic (telescopic) spotlight which is configured to enhance the functionality of manually adjusting the lighting fixture of the lamp during practical application lighting.

BRIEF SUMMARY OF THE TECHNOLOGY

In view of the above-mentioned defects of the prior art, the technical problem to be solved by the present invention is to provide a top spotlight that can be adjusted more conveniently according to the requirements and has an efficient, low-cost configuration.

According to the present invention there is provided a retractable spotlight, comprising a cylindrical outer casing and a lamp body, wherein the lamp body is movably supported inside the outer casing and can be moved in an axial direction between a retracted state, in which the lamp body is disposed inside the outer casing so that a head of the lamp body is retracted inside the outer casing, and an extended state, in which the lamp body extends at least partially out of the outer casing so that the head of the lamp body extends out of the outer casing, wherein a pressing assembly and a connecting assembly are disposed inside the outer casing, the connecting assembly comprises a connecting rod with a radial articulated shaft at a lower end of the connecting rod, the two opposite axial ends of the connecting assembly are connected to the pressing assembly and the lamp body, respectively, the pressing assembly biases the lamp body towards the extended position via the connecting assembly and is configured to be switched between a first position, in which the lamp body is in the retracted state, and a second position, in which the lamp body is in the extended state, and the lamp body is rotatably connected to the connecting rod via the radial articulated shaft.

According to a further embodiment, the pressing assembly may comprise a rotatable driving member with an annular body and at least one positioning rib protruding from the periphery of the annular body, and a first cam surface and a second cam surface are formed adjacent to each other on the inner wall of the outer casing with increasing lengths in the axial direction, for controlling an axial position of the pressing assembly inside the outer casing, wherein the rotatable driving member is rotatably supported inside the outer casing, in the retracted state, the positioning rib abuts against the first cam surface and, in the extended state, the positioning rib abuts against the second cam surface.

According to a further embodiment, at least two first cam surfaces and two second cam surfaces are provided are alternately along the circumference of the inner wall of the outer casing, each first cam surface includes a first beveled upper end, each second cam surface includes a second beveled upper end, each first cam surface is transitionally connected to an adjacent second cam surface by a first straight wall, and each second cam surface is transitionally connected to an adjacent first slide by a second straight wall.

According to a further embodiment, the pressing assembly further comprises a resilient member and a gear member configured to retain the rotatable driving member in the axial direction, the ends of the resilient member being resiliently supported by an upper end cover of the outer casing and the rotatable driving member, respectively, for biasing the lamp body towards the extended position via the connecting assembly, wherein an end of the gear member facing the rotatable driving member is provided with a sequence of circumferentially distributed oblique teeth, and a plurality of positioning ribs protrude from the outer surface of the rotatable driving member, each of said positioning ribs extending in an axial direction and abutting selected ones of the oblique teeth, wherein the pressing assembly is switched between the first position and the second position by axial displacement and rotation of the gear member According to a further embodiment, a straight slot extending in the axial direction is formed between each first cam surface and each second cam surface, the depth of the straight slot being greater than the depth of the second beveled upper end.

According to a further embodiment, the bottom of the positioning bar is provided with an oblique wedge shape, and the oblique surface is adapted to the first beveled surface and the second beveled surface.

According to a further embodiment, the bottoms of the positioning ribs are provided with a slanted wedge-shaped surface mated to the first beveled upper end and the second beveled upper end, respectively.

According to a further embodiment, the gear member is provided with a guiding rib on the outer periphery thereof, and a corresponding guiding slot is provided on the inner wall of the outer casing which fits to the guiding rib.

According to a further embodiment, the piston portion is provided with a damping member between the piston portion and the outer casing.

Further, the piston portion is provided with a locking hole radially penetrating into the inner cavity of the piston portion, and a locking member is fixedly connected to the connecting rod through the locking hole.

According to a further embodiment, the connecting assembly further comprises a piston portion, the connecting rod is fixedly clamped in an inner cavity of the piston portion, and the piston portion is axially movable along the inner wall of the outer casing.

According to a further embodiment, a damping member is provided between the piston portion and the inner wall of the outer casing, resiliently biasing the piston portion against the inner wall of the outer casing.

According to a further embodiment, the piston portion is provided with a locking hole extending radially into an inner cavity of the piston portion, and a locking member is fixedly connected to the connecting rod via the locking hole.

According to a further embodiment, the connecting rod is provided a wire cavity extending in the axial direction and a wire harness is connected to the lamp body via the wire cavity, wherein the inner cavity of the piston portion is further provided with a wire clamping sleeve having a first end and a second end opposite to the first end, the first end fixes the wire harness, the second end is threaded into the connecting rod, and the first end is disposed between the piston portion and the connecting rod.

According to a further embodiment, the inner wall of the second end of the wire clamping sleeve is provided with tabs on each side, and the wire harness is held and fixed by the tabs.

According to a further embodiment, the lamp body comprises a lamp barrel extending in axial direction, an articulated block provided inside the lamp body, the connecting rod is inserted into the articulated block, and the connecting rod is hinged to the articulated block at its lower end.

According to a further embodiment, a mounting frame is mounted on the outside of the outer casing and the side wall of the mounting frame is provided with at least one interconnection hole.

Technical effects of the present invention:

(1) In the retractable spotlight of the present invention an adjustment of the state of the lamp can be achieved simply by pressing an automatic locking feature, in particular by pushing the head of the lamp barrel upward in the retracted state to thereby release a locked position of the pressing assembly, and then by manually pushing and pulling the lamp body as required for adjustment. In vertical applications, the lamp head can be flat with the head of the lamp barrel retracted inside the mounting frame and outer housing to thereby enhance the anti-glare index of the lamp. The spotlight can be telescopically adjusted, so that the lamp body is extended out of the outer housing at least partially, Moreover, a radial rotation as needed can be achieved in the extended state, thus increasing the versatility of the single lamp adjustment in practical applications.

(2) The retractable spotlight of the present invention can solve the problem of the axial anti-pull of the wire, avoiding the pulling of the lamp in the adjustment movement, limiting the relative position of the wire in the internal unchanged, protecting the wire in the PCB welding joints without force, in order to ensure a higher security level and reliability of the electrical performance of the wire in the lamp, and better compliance with standard protection requirements.

The following will be combined with the accompanying drawings to further explain the conception of the invention, the specific structure and the technical effects produced, in order to fully understand the purpose, characteristics and effects of the invention.

BRIEF DESCRIPTION OF THE DRAWINGS

Hereinafter, the invention will be disclosed in an exemplary manner and with reference to the accompanying drawings, wherein the same reference numerals relate to the same or substantially equivalent features, and wherein.

DETAILED DESCRIPTION OF THE INVENTION

Figure 1:
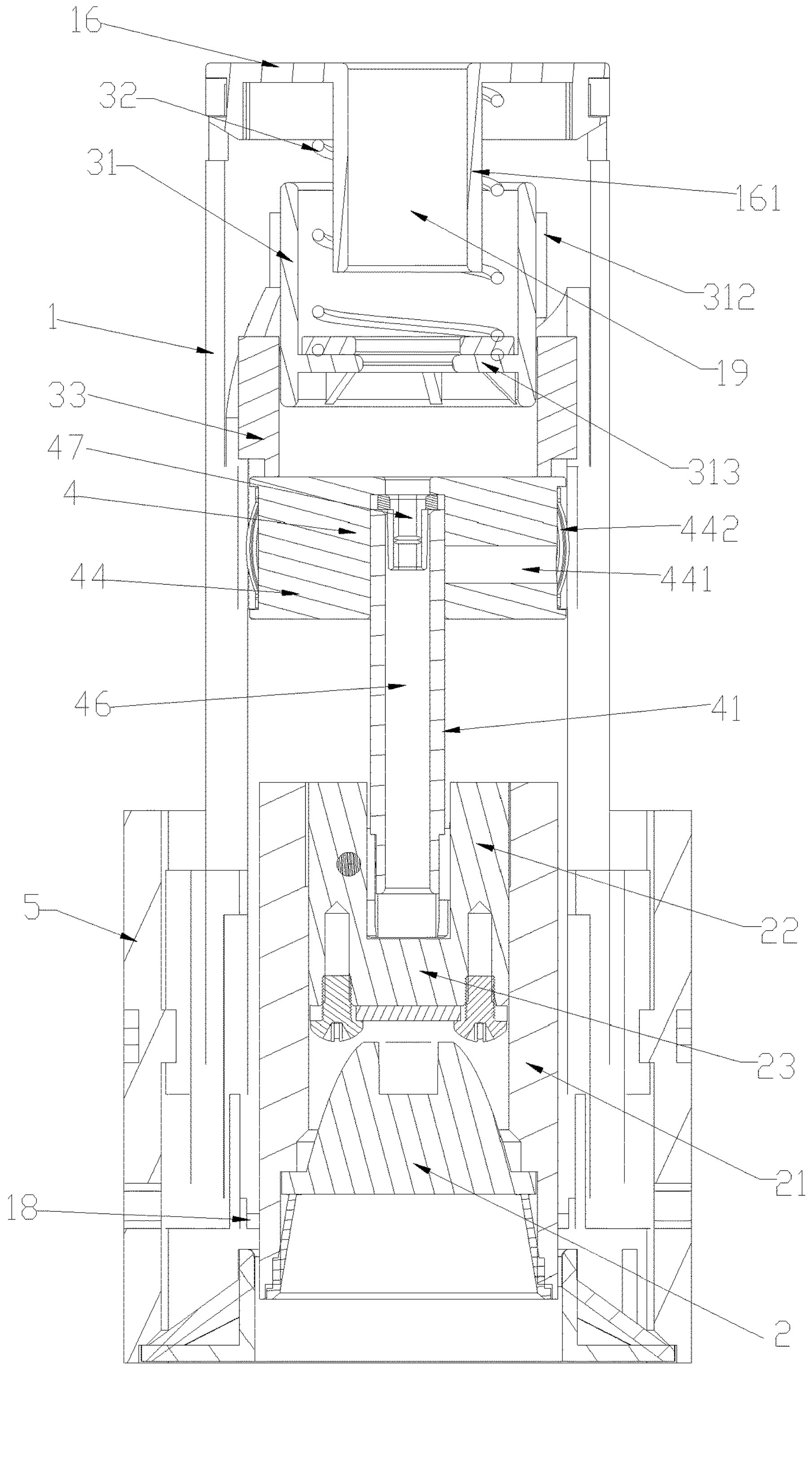
FIG. 1 is a schematic cross-sectional view of the retractable spotlight according to the present invention.

FIG. 1 is a schematic cross-sectional view showing the structure of the retractable spotlight of the present invention. The retractable spotlight of the present invention comprises an outer casing 1 which is a cylindrical member with an inner bore extending in axial direction. The lamp body 2 is disposed inside the outer casing 1 and can be moved up and down along the outer casing 1 in the axial direction. In FIG. 1, the lamp body 2 is in a retracted state, in which the entire lamp body is disposed inside the outer casing 1 and the head (front end) of the lamp body 2 is retracted inside the outer casing 1 and in particular does not extend beyond the bottom and of the outer casing 1.

The outer casing 1 is also provided with a pressing assembly 3 and a connecting assembly 4, each disposed inside the outer casing 1. The two opposite axial ends of the connecting assembly 4 are connected with the pressing assembly 3 and the lamp body 2, respectively. As outlined below in more detail, the pressing assembly 3 can be moved in axial direction along the inner wall of the outer casing 1. The lamp body 2, which is connected to the pressing assembly 3 via the connecting assembly 4, follows this axial displacement of the pressing assembly 3. More specifically, the pressing assembly 3 can be switched between a first position, in which the lamp body 2 is in a retracted state, and a second position, in which the lamp body 2 is in an extended state. In the retracted state, the lamp body 2 is moved toward the upper end of the outer casing 1 so that the lamp body 2 is disposed inside the outer casing 1 and the head of the lamp body 2 is retracted inside the outer casing 1. In the extended state the lamp body 2 extends at least partially out of the outer casing 1 and the head of the lamp body 2 extends out of the outer casing 1. For pushing the pressing assembly 3 toward the upper end of the outer casing 1, a user may push the lamp body 2 via an opening provided at the bottom end of the outer casing 1, and displacement of the lamp body 2 is transmitted to the pressing assembly 3 via the connecting assembly 4. The pressing assembly 3 resiliently biases the lamp body 2 towards the extended position via the connecting assembly 4. In the extended state, the pressing assembly 3 pushes the lamp body 2 at least partially out of the outer casing 1 via the connecting assembly 4, so that the head of the lamp body 2 extends out of the outer casing 1.

Figure 2:
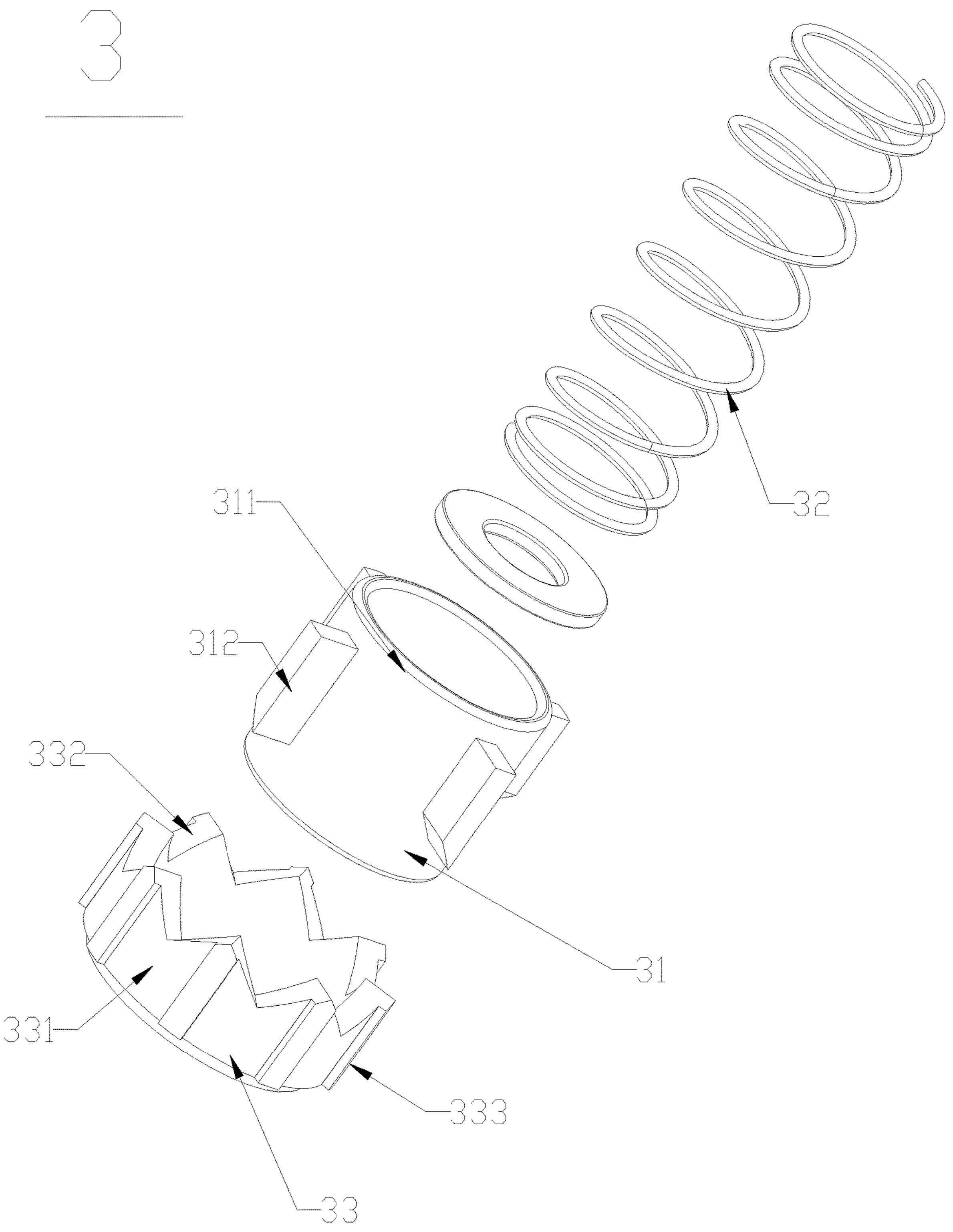
FIG. 2 is a schematic exploded view of the pressing assembly of the retractable spotlight according to the present invention.

The pressing assembly 3 is shown in FIG. 2, and mainly comprises a rotatable driving member 31, a resilient member 32, such as a resilient spring, and a gear member 33. The rotatable driving member 31 is rotatably supported inside the outer casing 1 and can be rotated relative to the gear member 33, as outlined below.

Figure 3:
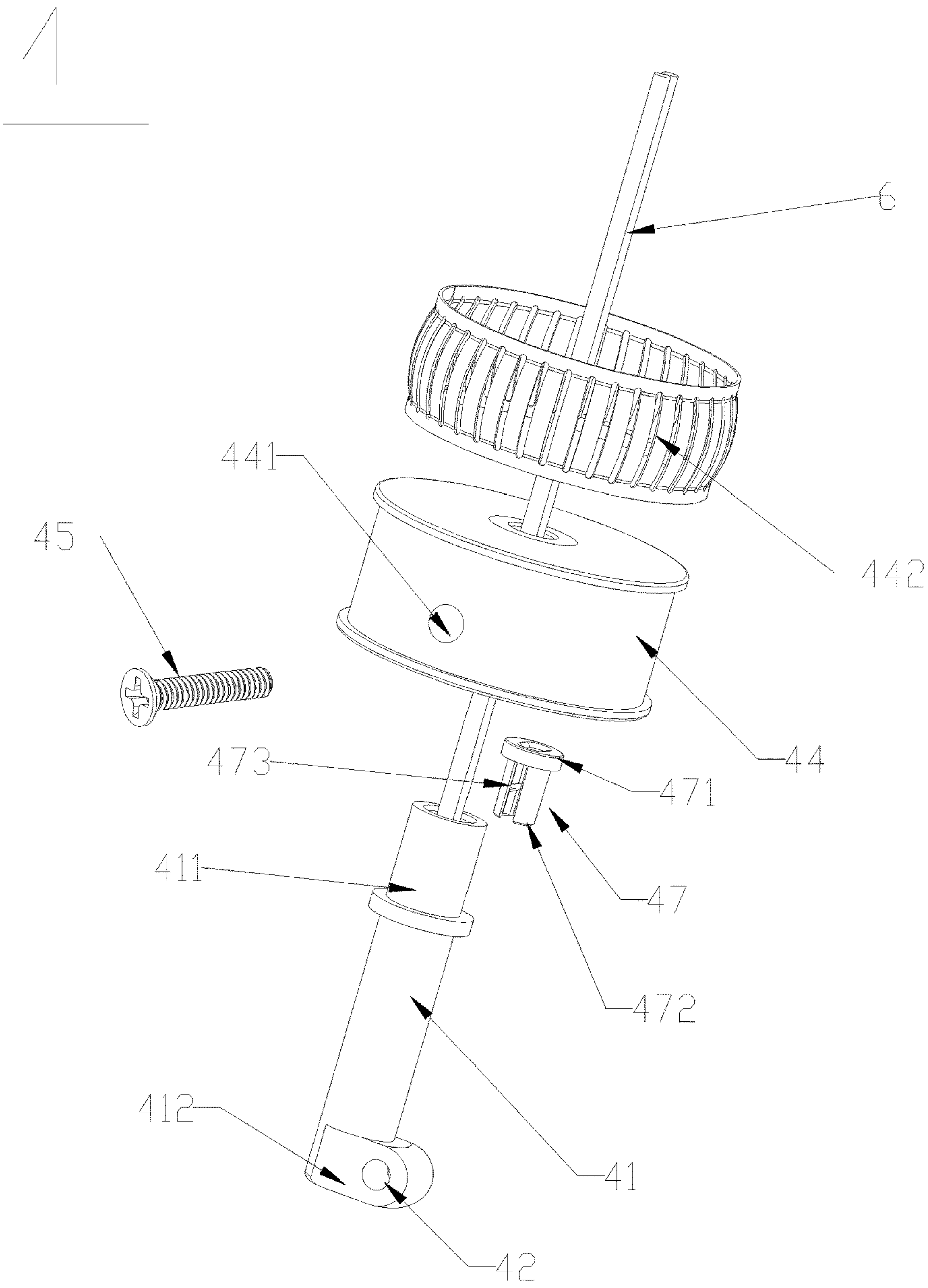
FIG. 3 is a schematic exploded view of the connecting assembly of the retractable spotlight according to the present invention.
Figure 7:
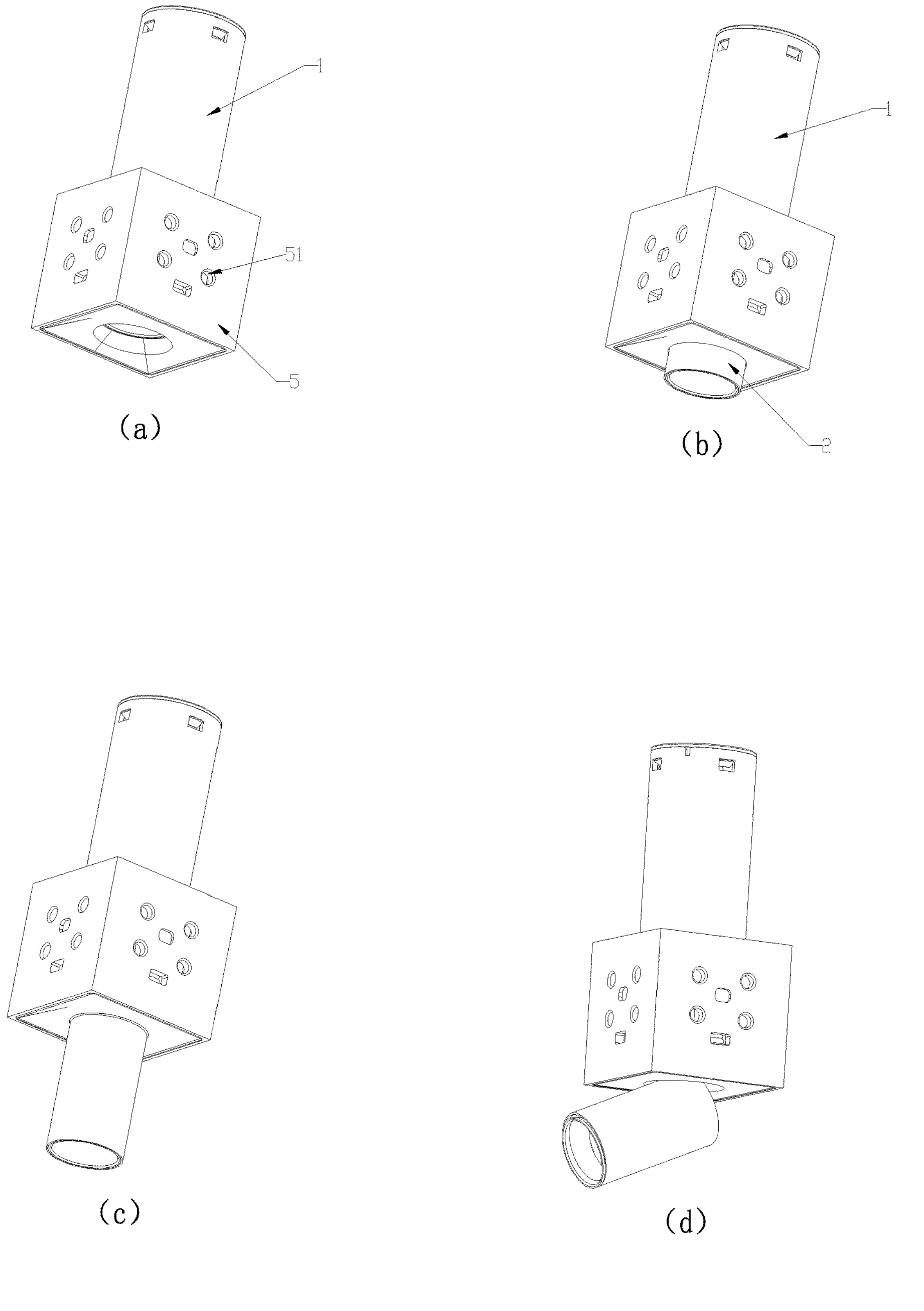
FIGS. 7*a* to 7*d* are schematic perspective side views of the retractable spotlight according to the present invention in different states during use.

As shown in FIGS. 1 and 3, the connecting assembly 4 comprises a connecting rod 41 with a radial articulated shaft (hinge shaft) 42 at a bottom end of the connecting rod 41, and the lamp body 2 is rotatably connected to the connecting rod 41 via the articulated block (hinge block) 22. As shown in FIG. 7*d*, the angle of inclination of the lamp body 2 relative to the axial direction can be varied by tilting the articulated shaft 42.

The lamp body 2 includes a lamp barrel 21 which may be snapped on its outside into the outer casing 1. The lamp barrel 21 extends axially inside the inner cavity of the outer casing 1 and the articulated block 22 is disposed inside the lamp barrel 21, in particular at an upper end thereof. The connecting rod 41 is coupled to the articulated block 22, e.g. by means of a pivot member 43, such as a screw, extending radially through or into it. Because of this coupling, the connecting assembly 4 and the lamp body 2 can be moved together in axial direction, and in the extended state the lamp body 2 can be exposed to the outer casing 1 (may extend beyond the front end of the outer casing 1) but also provides the function to adjust the lighting angle by rotation of the lamp body 2.

Figure 4:
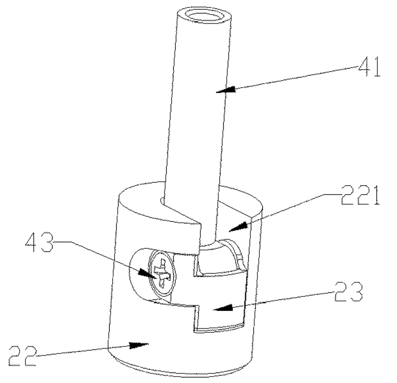
FIGS. 4*a* and 4*b* are schematic views of the connecting assembly of the retractable spotlight according to the present invention in an assembled state (a) and in an exploded view (b)
Figure 4:
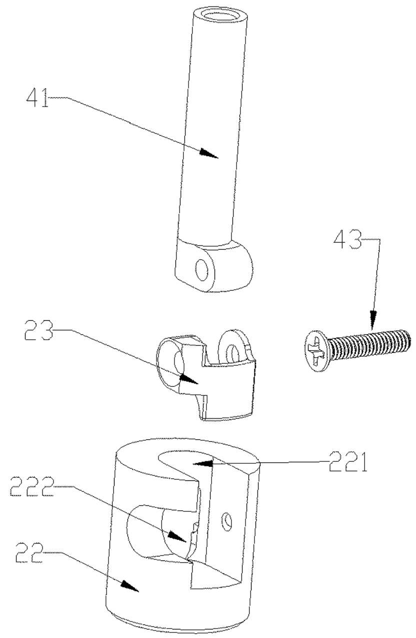

As shown in FIG. 4, a sliding block 23 may be fitted into the articulated block 22 by positive-fit for fixing the pivot shaft 43 and the connecting rod 41 in axial direction relative to the articulated block 22 to prevent disengagement.

Preferably, as shown in FIGS. 3 and 4, the connecting rod 41 is generally L-shaped at its bottom end and includes a longitudinal rod 411 extending in the axial direction and a transverse rod 412 extending transverse to the axial direction. An axial wire cavity 46 is formed inside the longitudinal rod 411 for the wire harness 6 to pass through in the axial direction and connect to the lamp body 2 for power supply. The pivot member 43 extends through the transverse rod 412 at the bottom end of the longitudinal rod 411. A first sliding groove 221 for the connecting rod 41 to rotate and pass through is formed at the upper end of the hinge block 22, and a second sliding groove 222 (cavity) for the lower end of the connecting rod 41 to rotate and pass through is further formed at one side of the hinge block 22 relative to the rotating direction.

In the present embodiment, the use state of the retractable spotlight is switched by the movement of the pressing assembly 3 relative to the outer casing 1. The pressing assembly 3 can be switched between the afore-mentioned first and second positions under the control of a cam structure formed on the inner circumferential wall of the outer casing 1.

Figure 5:
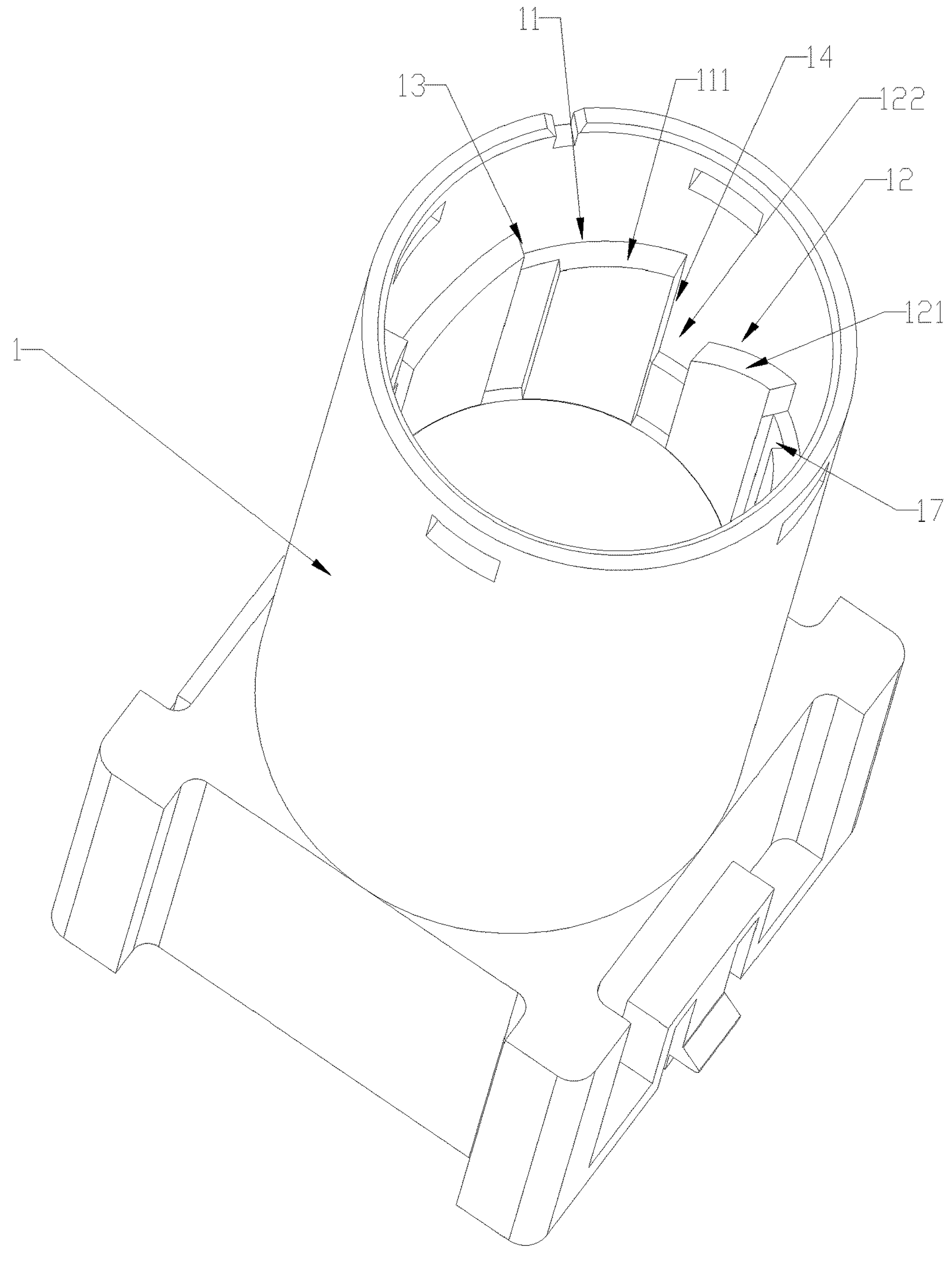
FIG. 5 is a schematic perspective view of the inner wall structure of the outer casing of the retractable spotlight according to the present invention with a cam structure for controlling an axial position of the pressing assembly inside the outer casing.

More specifically, as shown in FIGS. 2 and 5, the cam structure may comprise a first cam surface 11 and a second cam surface 12 formed adjacent to each other on the inner wall of the outer casing 1, the axial lengths of these cam surfaces 11 and 12 being different. The pressing assembly 3 includes a rotatable driving member 31 with an annular body 311 and at least one positioning rib 312 protruding from the periphery of the annular body 311 in radial direction. The axial position of the pressing assembly 3 is controlled by selective abutment of the at least one positioning rib 312 against the first cam surface 11 or second cam surface 12. As outlined below in more detail, axial displacement of the pressing assembly 3 towards the upper end of the outer casing 1 may cause a rotation of the rotatable driving member 31 relative to the gear member 33 to thereby switch the axial position of the pressing assembly and thereby switch the axial position of the lamp body 2.

In the retracted state, the positioning rib 312 may abut against (the bottom of) the first cam surface 11, and in the extended state, the positioning rib 312 may abut against (the bottom of) the second cam surface 12.

As shown in FIG. 5, at least two first cam surfaces 11 and at least two second cam surfaces 12 may be provided alternately along the circumference of the inner wall of the outer casing 1, and at least two positioning ribs 312 are provided on the outer periphery of the rotatable driving member 31. Preferably, the total number of the positioning ribs 312 corresponds to the total number of first and second cam surfaces 11, 12. Preferably, this total number is an even integer. Each first cam surface 11 may include a first beveled upper end 111, and each second cam surface 12 may include a second beveled upper end 121. The bottom of the first cam surface 11 is transitionally connected to the top of the second cam surface 12 via a first straight (axial) wall 13, and the bottom of the second cam surface 12 is transitionally connected to the top of the first cam surface 11 by a second straight (axial) wall 14. The positioning ribs 312 can slide along the first beveled upper end 111, the second beveled upper end 121, and are stopped by the first straight (axial) wall 13 and the second straight (axial) wall 14 after sliding.

As shown in FIG. 2, the pressing assembly 3 further includes a resilient member 32, such as a spring, and a gear member 33 that are cooperatively connected to the rotatable driving member 31. The resilient member 32 and the gear member 33 are configured to cooperate with the rotatable driving member 31 to make the rotatable driving member 31 switch positions between the first cam surface 11 and the second cam surface 12 along the inner wall of the outer casing 1. The two ends of the resilient member 32 are resiliently supported with the outer casing 1 (e.g. the upper end cap 16) and the rotatable driving member 31, respectively. The gear member 33 includes an annular wall 331, wherein one end of the annular wall 331 facing the rotatable driving member 31 is provided with a sequence of distributed oblique teeth 332 along the circumference, e.g. in a zig-zag sequence. The annular body 311 of the rotatable driving member 31 is mounted along the inner side of the annular wall 331, while the bottom ends of the positioning ribs 312 are abutted against the oblique teeth 332 as a result of the resilient biasing exerted by the resilient member 32. The bottom end of the gear member 33 is connected to the connecting assembly 4. The gear member 33 can move axially along the inner wall of the outer casing 1 and make the oblique teeth 332 transitionally connected to the first beveled upper end 111 or the second beveled upper end 121.

More specifically, the resilient member 32 may be a spring and the outer casing 1 may be provided with an upper end cover 16, which is provided with a connection post 161 for supporting the upper end of the spring 32. The opposite bottom end of the spring 32 is resiliently connected to an annular bearing plate 313 supported in the rotatable driving member 31. As shown in FIG. 2, in the pressing assembly 3, the resilient member 32, the rotatable driving member 31 and the gear member 33 are disposed in this order along the axial direction. The guiding rib 333 of the gear member 33 is guided along the guide groove 17 and the gear member 33 can be displaced upward, i.e. towards the upper end of the outer casing 1, when pushed by the connecting assembly 4 below it, and can move downward by the reaction force of the resilient member 32 when the pushing force is released.

As shown in FIG. 2, the bottom of each positioning rib 312 is provided with an oblique wedge shape, with all oblique surfaces of the positioning ribs 312 pointing in the same angular direction. The oblique surfaces of the positioning ribs selectively abut against the first beveled upper ends 111 and the second beveled upper ends 121 of the cam structure. In this way, when the gear member 33 is displaced, it can move smoothly with the bottom surfaces of the positioning ribs 312 contacting and sliding along the first beveled upper end 111 and the second beveled upper end 121, respectively, to thereby control the state of the pressing assembly 3 and of the lamp body 2.

As shown in FIG. 5, it is further preferable that a straight (axial) slot 122 is formed between each second cam surface 12 and each first cam surface 11, which is connected to the second beveled upper end 121 and oriented toward the lamp body 2, with the depth of the straight slot 122 being greater than the depth of the second beveled upper end 121. When the positioning rib 312 of the rotatable driving member 31 moves in the second slot 12, it first moves along the second beveled upper end 121 to the bottom end thereof and then slides further down along the straight slot 122, so that it can further push the lamp body 2 downward and outward, thereby increasing the extension amount of the lamp body 2 in the extended state.

The telescopic switching principle of the retractable spotlight of the present invention will be explained in more detail in the following with reference to FIGS. 6*a* to 6*e:*

Figure 6A:
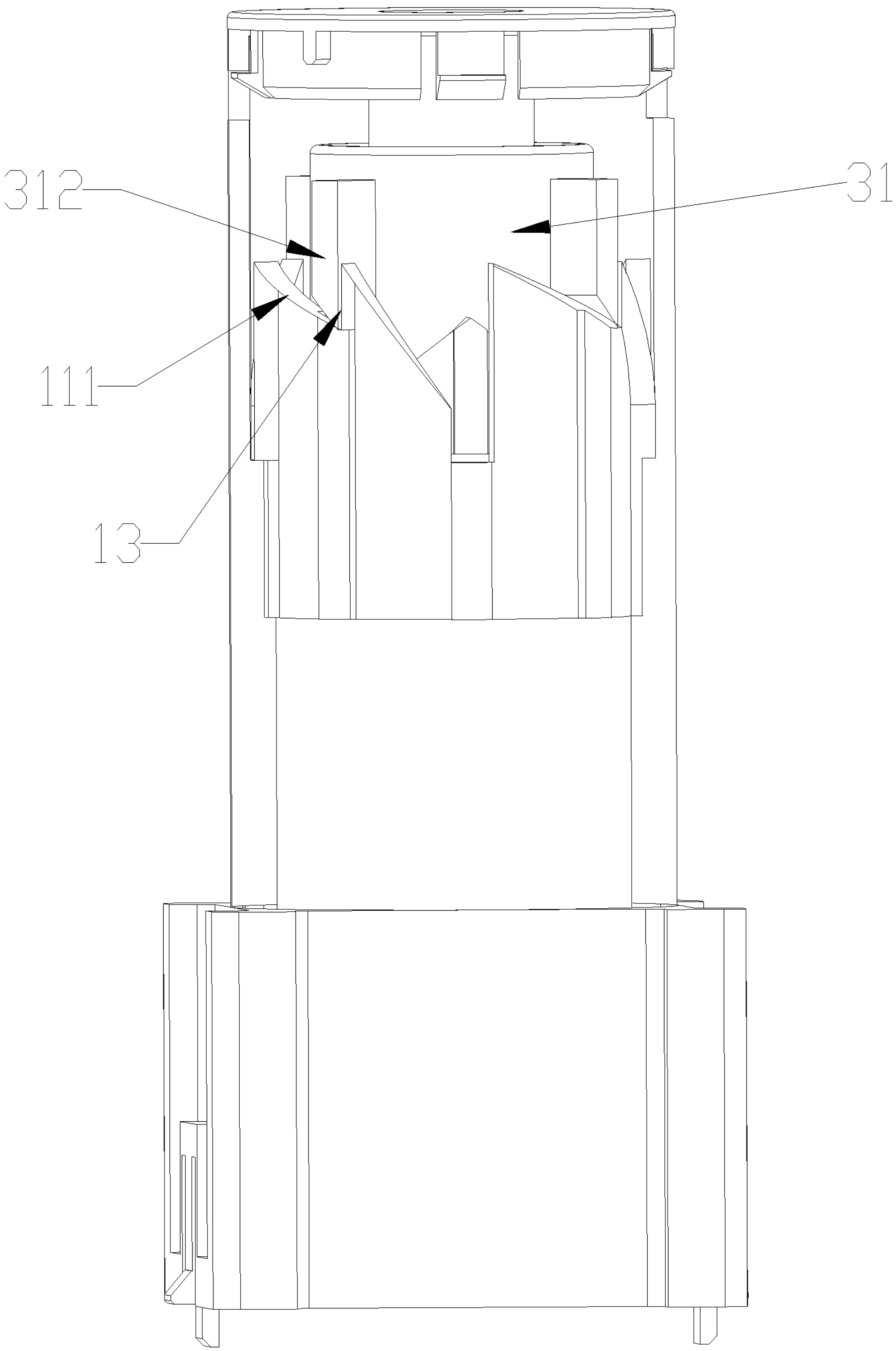
FIGS. 6*a* to 6*e* are schematic views showing the working principle of the pressing assembly of the retractable spotlight according to the present invention.
Figure 6B:
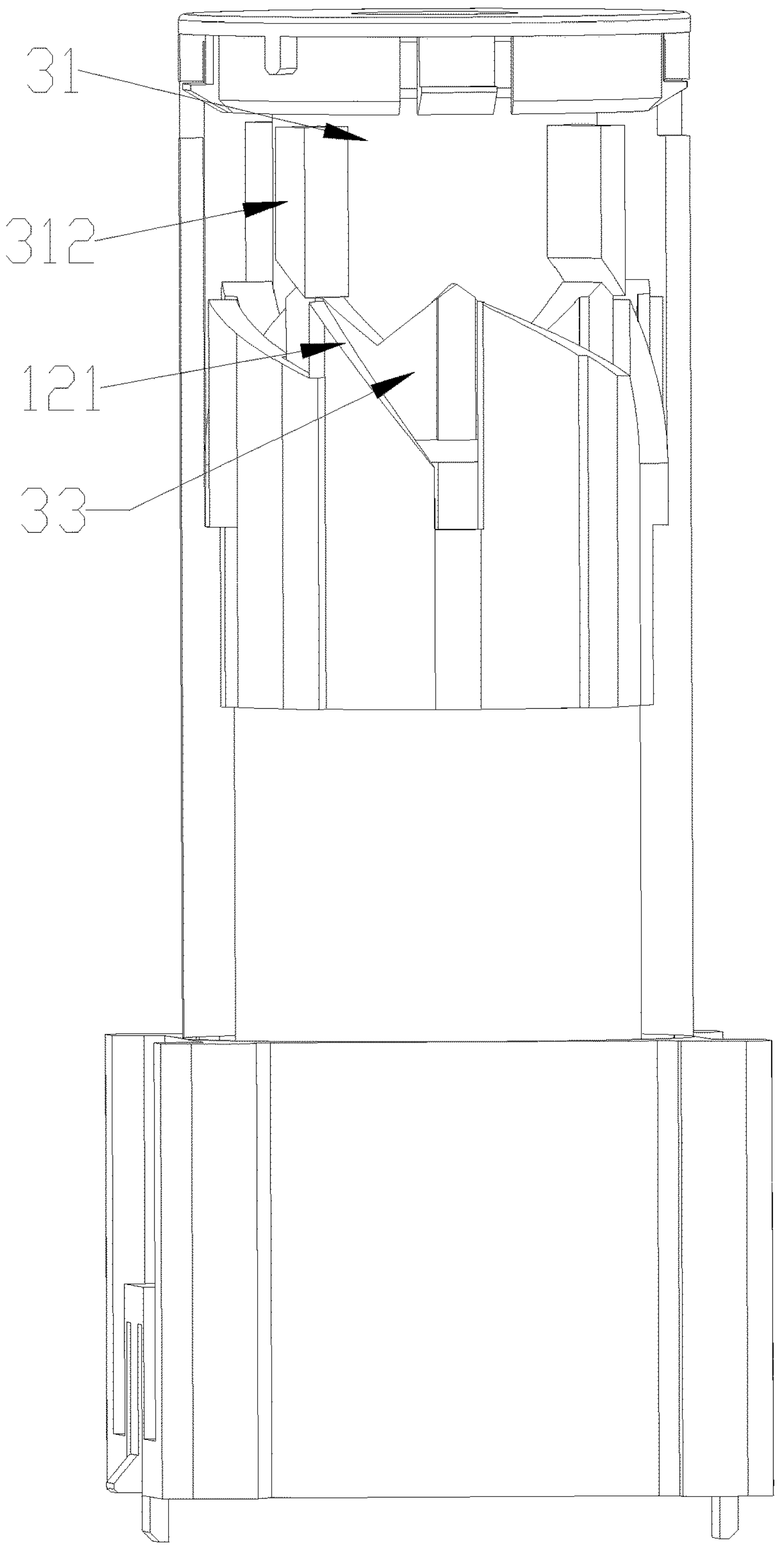
Figure 6C:
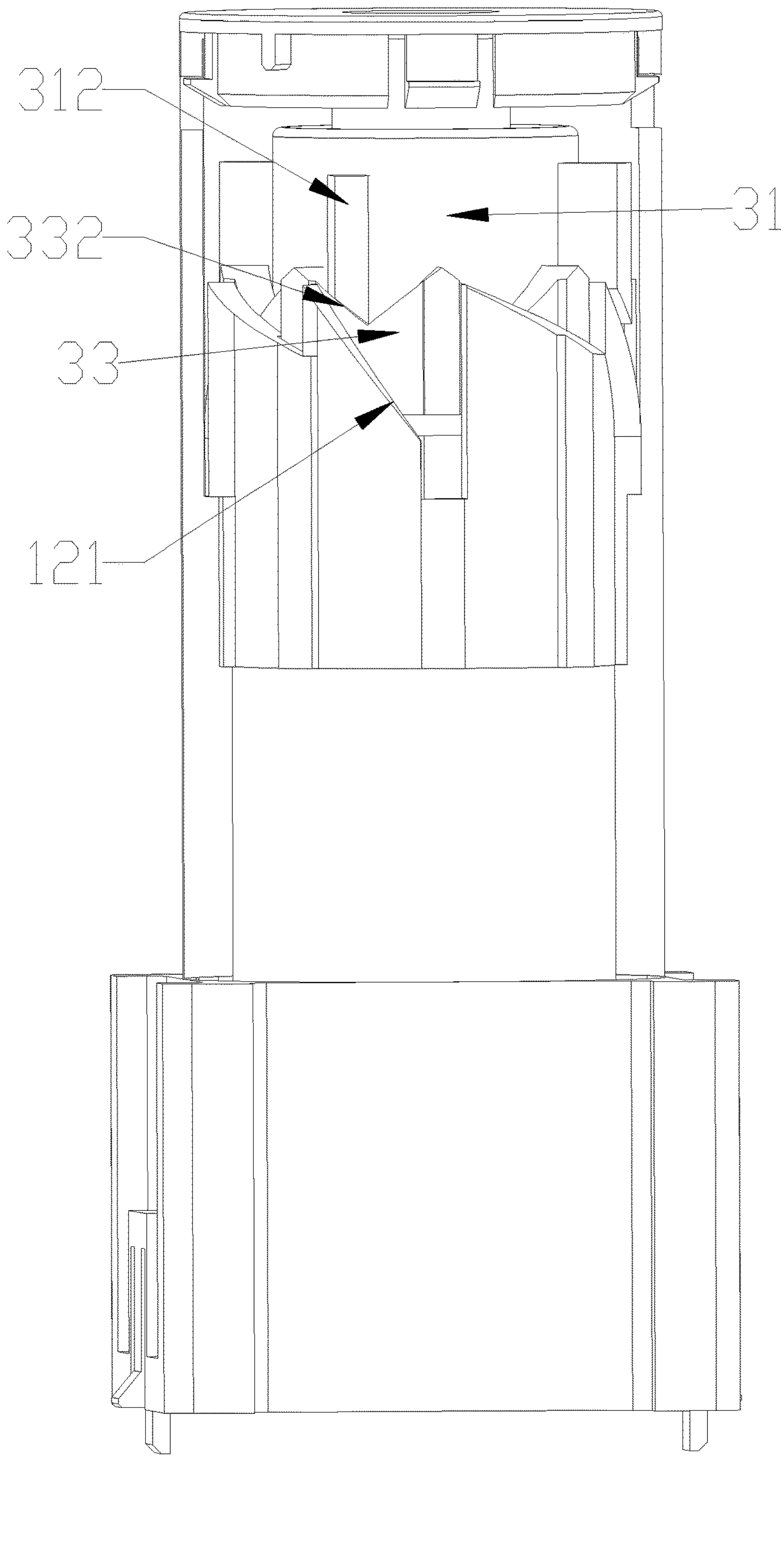
Figure 6D:
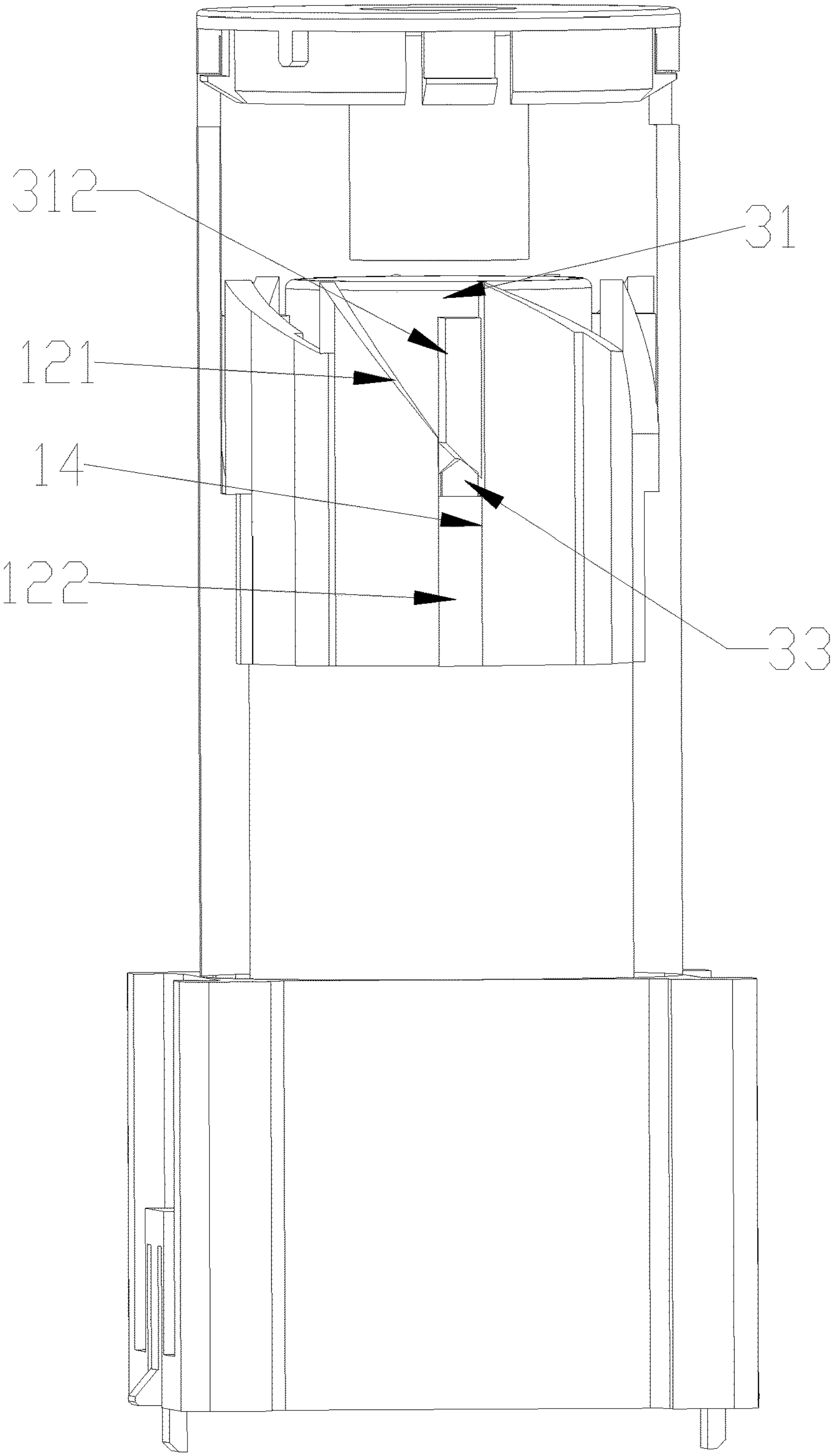
Figure 6E:
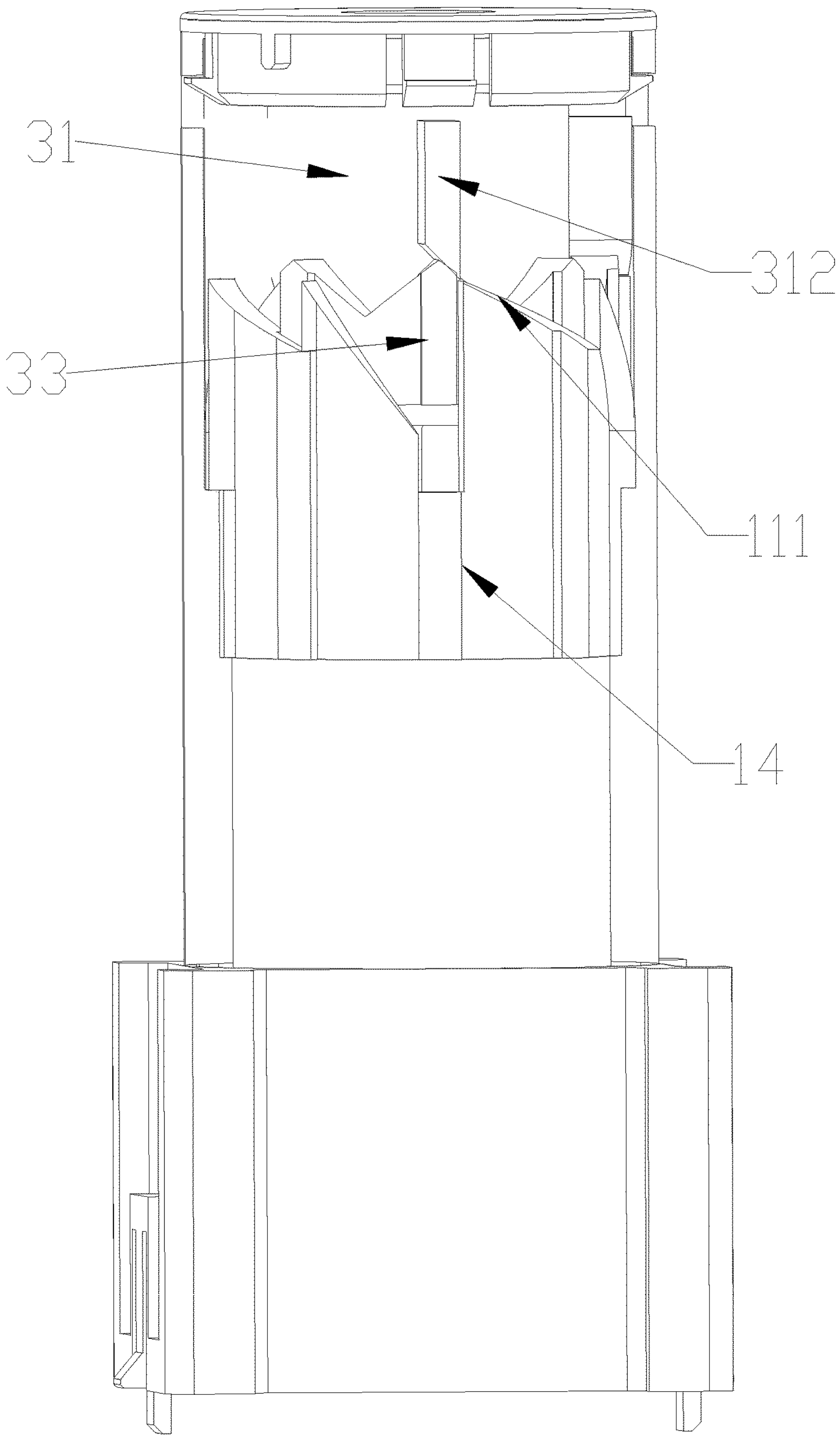

1. Initially in the retracted state, shown in FIG. 6*a*, the positioning rib 312 of the rotatable driving member 31 is positioned in abutment against the bottom of the first beveled upper end 111 of the first cam surface 11 and against the first straight wall 13. Abutment defines the angular position of the rotatable driving member 31.
2. From this retracted state, the lamp body 2 may be pushed upward so that the gear member 33 pushes the rotatable driving member 31 upward, as shown in FIG. 6*b*. The spring 32 is compressed and the positioning ribs 312 slide along the first straight walls 13 and transitions to the top of the second beveled upper ends 121 of the second cam surfaces 12. At that moment the spring 32 pushes the positioning ribs 312 so that they slide into the second beveled upper ends 121 through the transition of the oblique teeth 332 of the gear member 33 and end at the valleys of the oblique teeth 332.
3. When the pushing force (thrust) is released, the spring 32 pushes the rotatable driving member 31 downward and pushes the gear member 33 to move downward (see FIG. 6*d*) to expose the straight slot 122 of the second cam surface 12. The positioning ribs 312 of the gear member 33 slide into the bottoms of the straight slots 122 along the second beveled upper ends 121 and laterally against the second straight walls 14, at which time the lamp body 2 is at least partially pushed out of the end of the outer casing 1 so that the lamp body 2 is in the extended state. When the lamp body 2 is in the extended state 1, the connecting assembly 4 can be stretched continuously by pulling the lamp body 2 further out of the outer casing 1 to move downward so that the lamp body 2 is extended further out. Once the head of the lamp body 2 is extended out of the outer casing 1, the lamp body 2 can also be rotated by the pivot shaft so that the irradiation direction can be changed and adjusted according to requirements.
4. Then the lamp body 2 is pushed upwards again (see FIG. 6*e*), so that the gear member 33 pushes the rotatable driving member 31 to move upward, so that the spring 32 is compressed and the positioning ribs 312 slide along the second straight wall 14 and transition to the top ends of the first beveled upper ends 111 of the adjacent first cam surface 11 which is adjacent to the second straight wall 14. At this time, the spring 32 pushes the positioning ribs 312 to slide into the first beveled upper end 111 through the inclined teeth 332 of the gear member 33 and stop at the valleys of the inclined teeth 332.
5. When the pushing force (thrust) is released again, the spring 32 pushes the rotatable driving member 31 downward, and pushes the gear member 33 to move downward, causing the first beveled upper end 111 to be completely exposed and the positioning ribs 312 of the gear member 33 to slide along the first beveled upper end 111 to the bottom and abut against the first straight wall 13 from the side. At this time the lamp body 2 is pushed into the outer casing 1 again, to resume the retracted state shown in FIG. 6*a* again.

In the retractable spotlight of the present invention, the movement and rotating position of the lamp body 2 is further changed by providing the connecting assembly 4.

As shown in FIG. 3, the connecting assembly 4 includes a piston portion 44. The connecting rod 41 is fixedly clamped in the inner cavity of the piston portion 44. The piston portion 44 is axially movable along the inner wall of the outer casing 1. The piston portion 44 is provided with a locking hole 441 radially penetrating into the inner cavity of the piston portion 44, and a locking member 45 is fixedly connected to the connecting rod 41 through the locking hole 441. The locking member 45 may be a fastening screw, and the end of the fastening screw is tightly connected to the side of the connecting rod 41, thereby restricting the up and down movement of the connecting rod 41 relative to the piston portion 44 on the one hand, and preventing a circumferential rotation of the connecting rod 41 relative to the piston portion 44 on the other hand.

As shown in FIG. 1, a stop block 18 is optionally provided on the inner wall of the outer casing 1 to limit the extreme downward position of movement of the piston portion 44 and to prevent the piston portion 44 from disengaging from the outer casing 1.

Moreover, a damping member 442 may be provided between the piston portion 44 and the outer casing 1, to resiliently bias the piston portion 44 against the outer casing 1 and cause some friction sufficient to prevent the lamp barrel 21 to fall out of the outer housing 1 due to gravity. As shown in FIG. 3, the damping member 442 is selected as a spring ring in this embodiment, and the damping effect is created by the spring ring projecting elastically toward the inner wall of the outer casing 1, and can be stopped at the inner wall of the outer casing 1 when the piston portion 44 is not subject to a force. Optionally, the damping member 442 may also be embodied as a part such as a sealing ring or the like that is elastically contacting the inner wall of the outer casing 1.

As shown in FIGS. 1 and 3, a wire cavity 46 extending in axial direction is provided inside the connecting rod 41, and the wire harness 6 is connected to the lamp body 2 via the wire cavity 46 for electric power supply. The inner cavity of the piston portion 44 is further provided with a wire clamping sleeve 47, which includes a first end 471 and an opposite second end 472, wherein the first end 471 is interference fit with the wire harness 6 and the second end 472 is inserted into the connecting rod 41. The first end 471 is embedded between the piston portion 44 and the connecting rod 41. Moreover, the inner wall of the second end 472 of the wire clamping sleeve 47 is provided with protruding bars (tabs) 473 on opposite sides, and the wire harness 6 is clamped and fixed by the protruding bars (tabs) 473. The first end 471 is smaller than the outer diameter of the wire harness 6, and the wire harness 6 is clamped by the elasticity of the first end 471, and the wire harness 6 is fixed by the clamping effect of the protruding bars 473, and that part of the wire harness 6 clamped or fixed by the clamping sleeve 47 does not move relative to the connecting assembly 4.

The upper end cover 16 of the outer casing 1, the rotatable driving member 31 and the gear member 33 are all penetrated through in the middle by a wire passing channel 19, so that the wire harness 6 can extend from the outside of the outer casing 1 into the inner volume of the outer casing 1 to be connected to the lamp body 2 for electric power supply. Because the middle part of the wire harness 6 is fixed by the wire clamping sleeve 47, and because the connecting assembly 4 and the lamp body 2 move synchronously in use, that part of the wire harness 6 that is clamped by the wire clamping sleeve 47 and connected to the lamp body 2 cannot be pulled outside of the outer casing 1 when the lamp body 2 is moved for adjusting the light angle and position. Thus, the wire harness 6 is efficiently protected. Moreover, in this embodiment, the downward movement of the piston portion 44 is restricted (by the stopping block 18), and the movement of the connecting rod 41 relative to the piston portion 44 is also restricted, which also protects the wire harness 6 from being excessively stretched or twisted.

In addition, a mounting frame 5 is sleeved on the outer casing 1, in particular snapped onto the outer casing 1, and interconnection holes 51 are formed on the side wall of the mounting frame 5, preferably both through the mounting frame 5 and the wall of the outer casing 1 in alignment to each other. A plurality of retractable spotlights of the present invention can be connected adjacent to each other by means of the mounting frame 5 thereby enabling a modular assembly.

FIGS. 7*a* to 7*d* are schematic perspective side views of the retractable spotlight according to the present invention in different states during use. FIG. 7(*a*) shows the retracted state, where the head of the lamp body 2 is retracted inside the outer casing 1 and mounting frame 5 so that the spotlight can provide an anti-glare effect. FIG. 7(*b*) shows the extended state formed by pressing the lamp body 2 and pushing it out of the end (beyond the front end) of the outer casing 1. FIG. 7(*c*) shows a state after pulling the lamp body 2 out of the outer casing 1. FIG. 7(*d*) shows the use state after rotating the lamp body 2 about the rotating shaft. The retractable spotlight provided by the present invention can be adjusted telescopically, and the lamp body 2 can be extended out and radially rotated to be adjusted as required, thereby enhancing the versatility of single light adjustment in practical applications.

The above describes in detail a preferred specific embodiment of the present invention. It should be understood that a person of ordinary skill in the art can make various modifications and changes according to the general teaching of the present invention without departing from the inventive concepts. Therefore, any technical solution available to those skilled in the art through logic analysis, reasoning and limited experiments based on the prior art according to the general concept and teaching of the present invention should be within the scope of protection as defined by the appended claims.

What is claimed is:

1. A retractable spotlight, comprising a cylindrical outer casing (1) and a lamp body (2), wherein the lamp body (2) is movably supported inside the outer casing (1) and can be moved in an axial direction between a retracted state, in which the lamp body (2) is disposed inside the outer casing (1) so that a head of the lamp body (2) is retracted inside the outer casing (1), and an extended state, in which the lamp body (2) extends at least partially out of the outer casing (1) so that the head of the lamp body (2) extends out of the outer casing (1), wherein a mounting frame (5) is mounted on the outside of the outer casing (1) and a side wall of the mounting frame (5) is provided with at least one interconnection hole (51), a pressing assembly (3) and a connecting assembly (4) are disposed inside the outer casing (1), the connecting assembly (4) comprises a connecting rod (41) with a radial articulated shaft (42) at a lower end of the connecting rod (41), the two opposite axial ends of the connecting assembly (4) are connected to the pressing assembly (3) and the lamp body (2), respectively, the pressing assembly (3) biases the lamp body (2) towards the extended position via the connecting assembly (4) and is configured to be switched between a first position, in which the lamp body (2) is in the retracted state, and a second position, in which the lamp body (2) is in the extended state, and the lamp body (2) is rotatably connected to the connecting rod (41) via the radial articulated shaft (42).

2. The retractable spotlight as claimed in claim 1, wherein the pressing assembly (3) comprises a rotatable driving member (31) with an annular body (311) and at least one positioning rib (312) protruding from the periphery of the annular body (311), and a first cam surface (11) and a second cam surface (12) are formed adjacent to each other on the inner wall of the outer casing (1) with increasing lengths in the axial direction, for controlling an axial position of the pressing assembly (3) inside the outer casing (1), wherein the rotatable driving member (31) is rotatably supported inside the outer casing (1), in the retracted state, the positioning rib (312) abuts against the first cam surface (11) and in the extended state, the positioning rib (312) abuts against the second cam surface (12).

3. The retractable spotlight as claimed in claim 2, wherein at least two first cam surfaces (11) and two second cam surfaces (12) are provided are alternately along the circumference of the inner wall of the outer casing (1), each first cam surface (11) includes a first beveled upper end (111), each second cam surface (12) includes a second beveled upper end (121), each first cam surface (11) is transitionally connected to an adjacent second cam surface (12) by a first straight wall (13), and each second cam surface (12) is transitionally connected to an adjacent first slide (11) by a second straight wall (14).

4. The retractable spotlight as claimed in claim 3, wherein the pressing assembly (3) further comprises a resilient member (32) and a gear member (33) configured to retain the rotatable driving member (31) in the axial direction, the ends of the resilient member (32) being resiliently supported by an upper end cover (16) of the outer casing (1) and the rotatable driving member (31), respectively, for biasing the lamp body (2) towards the extended position via the connecting assembly (4), wherein an end of the gear member (33) facing the rotatable driving member (31) is provided with a sequence of circumferentially distributed oblique teeth, and a plurality of positioning ribs (312) protrude from the outer surface of the rotatable driving member (31), each of said positioning ribs (312) extending in an axial direction and abutting selected ones of the oblique teeth, wherein the pressing assembly (3) is switched between the first position and the second position by axial displacement and rotation of the gear member (33).

5. The retractable spotlight as claimed in claim 3, wherein a straight slot (122) extending in the axial direction is formed between each first cam surface (11) and each second cam surface (12), a depth of the straight slot (122) being greater than a depth of the second beveled upper end (121).

6. The retractable spotlight as claimed in claim 5, wherein the bottoms of the positioning ribs (312) are provided with a slanted wedge-shaped surface mated to the first beveled upper end (111) and the second beveled upper end (121), respectively.

7. The retractable spotlight as claimed in claim 4, wherein the gear member (33) is provided with a guiding rib (333) on the outer periphery thereof, and a corresponding guiding slot (17) is provided on the inner wall of the outer casing (1) which fits to the guiding rib (333).

8. The retractable spotlight as claimed in claim 1, wherein the connecting assembly (4) further comprises a piston portion (44), the connecting rod (41) is fixedly clamped in an inner cavity of the piston portion (44), and the piston portion (44) is axially movable along the inner wall of the outer casing (1).

9. The retractable spotlight as claimed in claim 8, wherein a damping member (442) is provided between the piston portion (44) and the inner wall of the outer casing (1), resiliently biasing the piston portion (44) against the inner wall of the outer casing (1).

10. The retractable spotlight as claimed in claim 8, wherein the piston portion (44) is provided with a locking hole (441) extending radially into an inner cavity of the piston portion (44), and a locking member (45) is fixedly connected to the connecting rod (41) via the locking hole (441).

11. The retractable spotlight as claimed in claim 8, wherein the connecting rod (41) is provided a wire cavity (46) extending in the axial direction and a wire harness (6) is connected to the lamp body (2) via the wire cavity (46), wherein the inner cavity of the piston portion (44) is further provided with a wire clamping sleeve (47) having a first end (471) and a second end (472) opposite to the first end (471), the first end (471) fixes the wire harness (6), the second end (472) is threaded into the connecting rod (41), and the first end (471) is disposed between the piston portion (44) and the connecting rod (41).

12. The retractable spotlight as claimed in claim 11, wherein the inner wall of the second end (472) of the wire clamping sleeve (47) is provided with tabs (473) on each side, and the wire harness (6) is held and fixed by the tabs (473).

13. The retractable spotlight as claimed in claim 1, wherein the lamp body (2) comprises a lamp barrel (21) extending in axial direction, an articulated block (22) is provided inside the lamp body (2), the connecting rod (41) is inserted into the articulated block (22), and the connecting rod (41) is hinged to the articulated block (22) at its lower end.

* * * * *